US010773803B2

(12) United States Patent
Qiu et al.

(10) Patent No.: US 10,773,803 B2
(45) Date of Patent: Sep. 15, 2020

(54) AUTOMATIC DEGRADABLE SPHERE DISTRIBUTING DEVICE FOR UNMANNED AERIAL VEHICLE

(71) Applicant: JIANGSU UNIVERSITY, Jiangsu (CN)

(72) Inventors: Baijing Qiu, Jiangsu (CN); Xiang Tong, Jiangsu (CN)

(73) Assignee: JIANGSU UNIVERSITY, Jiangsu (CN)

( * ) Notice: Subject to any disclaimer, the term of this patent is extended or adjusted under 35 U.S.C. 154(b) by 428 days.

(21) Appl. No.: 15/761,994

(22) PCT Filed: Nov. 10, 2015

(86) PCT No.: PCT/CN2015/094173

§ 371 (c)(1),
(2) Date: Mar. 21, 2018

(87) PCT Pub. No.: WO2017/049746

PCT Pub. Date: Mar. 30, 2017

(65) Prior Publication Data

US 2018/0265198 A1 Sep. 20, 2018

(30) Foreign Application Priority Data

Sep. 21, 2015 (CN) .......................... 2015 1 0598613

(51) Int. Cl.
*B64D 1/00* (2006.01)
*B64D 1/08* (2006.01)
(Continued)

(52) U.S. Cl.
CPC .............. *B64D 1/08* (2013.01); *B64C 39/024* (2013.01); *B64D 1/02* (2013.01)

(58) Field of Classification Search
CPC ........ B65D 39/06; B65D 83/0409; A47F 1/03
(Continued)

(56) References Cited

U.S. PATENT DOCUMENTS

| | | | | | |
|---|---|---|---|---|---|
| 2,525,261 | A | * | 10/1950 | Henderson ................ | F25D 3/00 221/150 R |
| 2,664,223 | A | * | 12/1953 | Dobkin ............. | B65D 83/0409 221/265 |

(Continued)

FOREIGN PATENT DOCUMENTS

| | | |
|---|---|---|
| CH | 707436 A1 | 7/2014 |
| CN | 202190661 U | 4/2012 |

(Continued)

*Primary Examiner* — Viet Le
(74) *Attorney, Agent, or Firm* — Saliwanchik, Lloyd & Eisenschenk

(57) ABSTRACT

An automatic degradable sphere distributing device for an unmanned aerial vehicle, relating to the technical field of plant protection mechanism. Said distributing device comprises a ranking portion, an adjustment portion and a distributing portion. The ranking portion consists of a rotating shaft (2), blades (1*a*, 1*b*), a rolling bearing (12), a sphere cabinet (3), a coupling (9*b*), a motor support (11*b*) and a motor (10*b*). The adjustment portion consists of a housing (501), a bevel gear transmission group (502, 503) and adjustment sheets (504*a*, 504*b*, 504*c*). The distributing portion consists of circular wheels (8*a*, 8*b*), a spur gear group (6*a*, 6*b*), a guide rod (13), a coupling (9*a*), a motor support (11*a*) and a motor (10*a*). Said distributing device may rank the degradable spheres vertically in sequence, being adaptable to spheres of different volumes, being highly universal, and being capable of distributing the spheres at intervals, with high precision and automation degree.

10 Claims, 6 Drawing Sheets

(51) Int. Cl.
*B64C 39/02* (2006.01)
*B64D 1/02* (2006.01)

(58) Field of Classification Search
USPC .................. 239/650–689; 473/53, 132–136; 222/236–242, 305
See application file for complete search history.

(56) References Cited

U.S. PATENT DOCUMENTS 3,292,840 A * 12/1966 Schmidt ............... B65D 81/365 220/4.25
3,767,126 A * 10/1973 Van Der Lely ...... A01C 15/006 239/661
3,894,657 A * 7/1975 Eckmayr ................ G07F 11/44 221/265
4,892,255 A 1/1990 Waldrum
5,236,507 A * 8/1993 Brown .................... B65B 55/20 118/302
5,794,847 A * 8/1998 Stocker ................ A01G 13/065 239/171
5,988,535 A * 11/1999 Kime .................... E01H 10/007 239/172
5,993,843 A * 11/1999 Sakurada ................ A01M 1/02 424/403
6,027,053 A * 2/2000 Anderson ............ A01C 17/008 239/681
6,159,489 A * 12/2000 Sakurada ................ A01M 1/02 424/403
6,179,719 B1 * 1/2001 Hwang .............. A63B 57/0006 473/137
6,299,021 B1 * 10/2001 Haas ....................... B41F 23/06 222/64
6,306,913 B1 * 10/2001 Hayes .................... A01N 31/14 106/15.05
6,419,589 B1 * 7/2002 Carter ................ A63B 57/0006 221/277
6,419,943 B1 * 7/2002 Sakurada ................ A01M 1/02 424/409
6,626,313 B2 * 9/2003 Herbstreit ............ A01K 67/033 220/4.25
7,166,034 B2 * 1/2007 Hines ................. A63B 57/0006 473/137
8,070,570 B2 * 12/2011 Murray .............. A01D 41/1243 460/111
D661,540 S * 6/2012 Facey ............................ D7/354
D713,265 S * 9/2014 Cooper .......................... D9/721
9,096,391 B2 * 8/2015 Simpson ............ B65G 47/1485
9,457,437 B2 * 10/2016 Sasaki ................ B65G 47/1485
2002/0117562 A1 * 8/2002 Kost .................... A01C 17/008 239/666
2003/0168536 A1 * 9/2003 Kost ..................... E01C 19/204 239/687
2006/0207163 A1 * 9/2006 Frokopy .............. A01N 25/006 43/131
2010/0133365 A1 * 6/2010 Bailey ................... E01H 1/0809 239/663
2014/0097264 A1 * 4/2014 Detweiler .............. A01M 11/00 239/1

FOREIGN PATENT DOCUMENTS

CN 203027992 U 7/2013
CN 203623966 U 6/2014
CN 103963974 A 8/2014
CN 204507271 U 7/2015

* cited by examiner

AUTOMATIC DEGRADABLE SPHERE DISTRIBUTING DEVICE FOR UNMANNED AERIAL VEHICLE

CROSS REFERENCE TO RELATED APPLICATIONS

This application is a National Stage Application of International Application Number PCT/CN2015/094173, filed Nov. 10, 2015; which claims priority to Chinese Application No. 201510598613.4, filed Sep. 21, 2015.

FIELD OF THE INVENTION

The present invention relates to the technical field of plant protection mechanism, in particular to an automatic degradable sphere distributing device for unmanned aerial vehicle.

BACKGROUND ART

Presently, biological pest control methods have become popular increasingly. With regard to biological control, the population quantity of pests is controlled with metabolic products of various beneficial animals or organisms in the natural world, so as to ultimately protect normal growth of crops. Among existing biological control methods, the methods of insect pest control are widely applied. There are many kinds of animals that prey on pests, such as ladybugs, lacewings, wasps, hoverflies, and spiders, etc. Those natural enemies of pests have a big appetite and can attain a good pest control effect. Parasitic natural enemies mainly include parasitic wasps and parasitic flies, such as trichogramma, which lay eggs inside larvae or kidneys of pests, and thereby inhibit pest propagation. Insect pest control is applied most widely, and is a main content of biological control.

For biological control of diseases and pests, releasing natural enemies is a main technical problem. In the prior art, natural enemies are mainly released with a manual releasing method, which has low releasing efficiency and is unsuitable for large-area operation.

In view of that problem, automatic distributing devices have been conceived, to distribute natural enemies with assistance of an airplane, for example in the Patent Application with application No. 201120328245.9 and entitled "Natural Enemy Distributor for Airplane", during use, natural enemies are loaded into a box, the motor speed is adjusted to control the rotation of impellers, and thereby the natural enemies are transferred to a conveyer belt at a constant speed, conveyed by the conveyer belt, distributed into a natural enemy spray duct, and then distributed onto a motor-driving rotating disc through the natural enemy spray duct, and thrown away under centrifugal force; thus, the distributing efficiency is effectively improved while the natural enemies are distributed in a large area. However, the device has low reliability and is difficult to be installed on an airplane; the survival ratio of the natural enemies is low owing to the fact that the natural enemies may contact with the rotating blades rigidly; the quantity of natural enemies distributed in some areas may be too high or too low, because the device cannot distribute at intervals.

For example, a natural enemy distributing device is disclosed in Patent Application No.201220699049.7 entitled "Natural Enemy Distributing Device for Airplane", wherein, the natural enemies are distributed by means of a motor-driving support frame under centrifugal force. However, the device can't control the distributing time accurately; in addition, the device cannot control the distributing quantity of natural enemies accurately and has low reliability, owing to size differences of the natural enemies.

All of the above-mentioned patents utilize the centrifugal force to distribute natural enemies, have many defects and low reliability, and the centrifugal force may have impact on the flight stability of the airplane.

CONTENTS OF THE INVENTION

The object of the present invention is to provide an automatic degradable sphere distributing device for unmanned aerial vehicle. Natural enemies are loaded into degradable spheres, and are distributed by distributing the spheres. Since the sphere is degradable, they will not pollute the environment. The device realizes automatic distributing of degradable spheres at equal time interval, is adaptable to spheres in different diameters, has high universality and attains a high degree of automation.

The degradable sphere comprises: a storage hemisphere, a packaging hemisphere, and a silicone ring; wherein, the storage hemisphere and the packaging hemisphere are fitted with each other via concave and convex grooves to form a sphere, and are fixed with the silicone ring; the storage hemisphere accounts for ⅔ of the total volume of the sphere, so that more natural enemies and nutrient substances can be stored in the storage hemisphere; the packaging hemisphere has evenly distributed air holes and the external surface of the packaging hemisphere is coated with a water-soluble film, to facilitate going out of the natural enemies.

Furthermore, the diameter of the air holes is greater than the maximum dimension of the natural enemy by 3 mm.

Furthermore, the air holes on the packaging hemisphere are spaced apart from each other by 5 mm in the direction of the sphere generatrices which are arranged along the circumference with an angle of 40° between each other.

Furthermore, the spheres are made of degradable materials by milling 30wt % rice husks, 50wt % straws and 15wt % wood flour, mixing with 3wt % hot-melt adhesive and 2wt % glue, and then hot-press molding the mixture; therefore, the spheres will not pollute the environment.

The automatic degradable sphere distributing device for unmanned aerial vehicle comprises: a ranking portion, an adjustment portion, a distributing portion, and a base; the ranking portion comprises: two blades, a rotating shaft, a sphere cabinet, and a driving portion that drives the rotating shaft to rotate, wherein, the ranking portion is fixed to the base via two support posts on the bottom surface of the sphere cabinet, a ring-shaped area is arranged on the surface of the sphere cabinet, and the bottom surface of the ring-shaped area is a conical surface, which is higher at the center and lower on the periphery; a shaft hole is arranged at the center of the conical surface, the rotating shaft is mounted in the shaft hole and connected to the driving portion fixed to the bottom surface of the sphere cabinet, and sphere inlets are distributed symmetrically on the conical surface, centering on the rotating shaft; the two blades are mounted on the rotating shaft symmetrically and match the shape of the conical surface; inclined sphere transport channels are arranged between the bottom surface of the conical surface and the bottom surface of the sphere cabinet, and are connected to sphere outlets on the bottom surface of the sphere cabinet.

Furthermore, the cross section of the sphere transport channel is circular.

Furthermore, the cone angle of the bottom surface of the ring-shaped area is 20°; six sphere inlets are distributed symmetrically on the conical surface at an equal interval.

Furthermore, the two blades are in the same plane; the lower edge of the blade is parallel to the conical surface, with 2-3 mm clearance from the conical surface and the inner side of the ring-shaped area.

Furthermore, the driving portion that drives the rotating shaft to rotate comprises a coupling, a motor, a motor support, and a rolling bearing; the motor support is located right below the sphere cabinet, the two ends of the motor support are connected to the bottom of the sphere cabinet via bolts, the motor is fixed to the motor support and connected to the coupling, the coupling is connected to the rotating shaft, the rolling bearing is located below a shaft shoulder of the rotating shaft in clearance fit with the rotating shaft, and is positioned in the axial direction by means of the shaft shoulder.

The adjustment portion consists of two portions, each of which comprises a housing, a small bevel gear, a big bevel gear, and three adjustment sheets; the housing is mounted on the bottom surface of the sphere cabinet symmetrically, and is located below the sphere outlet in the bottom surface of the sphere cabinet, a shaft end of the small bevel gear is located on the wall of the housing and is engaged with a side of the big bevel gear mounted in the housing, the three adjustment sheets are evenly distributed on the circumference of the bottom surface of the big bevel gear, the big bevel gear can be driven by rotating the small bevel gear, so that the three adjustment sheets retract or extend in the radial direction to adapt to the diameter of spheres to be distributed.

Furthermore, the bottom surface of the big bevel gear has rectangular threads, the adjustment sheet is in an inverted L-shape and is mounted to the bottom surface of the big bevel gear via the bottom edge of the L-shape, the bottom edge of the L-shape also has rectangular threads engaged with the rectangular threads on the bottom surface of the big bevel gear, and the bottom edge of the L-shape is fitted in an I-shaped slide channel on the housing, so that the big bevel gear drives the three adjustment sheets to retract or extend linearly in the radial direction.

Furthermore, the three L-shaped adjustment sheets are at the same distance to the center of the housing, the inner side of each adjustment sheet is embossed, and the adjustment sheets are distributed annularly on the back of the big bevel gear, with an angle of 120° between each other; the mass of the degradable sphere is m, the diameter of the sphere is d, and the maximum bearing pressure is F, then the length of each adjustment sheet is $$l \leq \frac{F}{mg} \times d.$$

A 45° chamfer exists at the intersection between the bottom edge and the vertical edge of each of the three L-shaped adjustment sheets, to ensure a sphere can pass through the housing and enter into the adjustment sheets successfully.

Spherical grooves are arranged on the surface of the base right below the adjustment portion, so that degradable spheres distributing from the adjustment portion will not roll around.

A layer of cotton is lined on the bottom of the spherical groove and a piece of smooth and soft paper is laid on the cotton, to attain a buffer function for a falling degradable sphere and reduce the friction force suffered by the sphere when exiting the groove.

The vertical distance between the top surface of the base and the bottom of the adjustment sheet is greater than the diameter of a degradable sphere and smaller than the sum of diameters of two degradable spheres.

The distributing portion is below the adjustment portion and between two spherical grooves on the surface of the base, and comprises: a circular wheel, a driving mechanism that drives the circular wheel to rotate, a guide rod, and slide grooves; two slide grooves are fixed to the base and parallel to each other; the guide rod is located between the two slide grooves, a rectangular cavity portion of the guide rod is perpendicular to the slide grooves, the circular wheel is located in the rectangular cavity and tangent to two sides of the rectangular cavity, striker bars of the guide rod are fixed to two sides of the rectangular cavity, in line with the two spherical grooves and parallel to the slide grooves; when the driving mechanism drives the circular wheel to rotate, the rectangular cavity will work with the slide grooves to drive the striker bars of the guide rod to slide back and forth to strike the spheres, so that the spheres are distributed.

Furthermore, the cross section of each end of the striker bar of the guide rod is semi-circular, so that the striker bar can push a degradable sphere out of the spherical groove easily to facilitate distributing.

Furthermore, the driving mechanism that drives the circular wheel to rotate comprises a gear shaft, a coupling, a motor, and a motor support, wherein, the motor support is connected to the base via bolts, the motor is fixed to the motor support and connected to the coupling, the coupling is connected to the gear shaft, and the gear shaft is connected to the circular wheel via a flat key.

Furthermore, in case that two gear shafts and two circular wheels are provided and the circular wheels are standard circles, a connection point between the gear shaft and the circular wheel is offset from the center of the circular wheel by ⅔ radius and is in a horizontal symmetric center line of the rectangular cavity, and the circular wheel is tangent to the rectangular cavity and is symmetric in relation to a connecting line between the striker bars; the two ends of the rectangular cavity are closed and fitted in the slide grooves, so that the guide rod is an integral piece.

Furthermore, in a case that two gear shafts and two circular wheels are provided and the circular wheels are ellipse, a connection point between the gear shaft and the circular wheel is at a center of the ellipse, the ellipse is tangent to the rectangular cavity and is symmetric in relation to a connecting line between the striker bars; the two ends of the rectangular cavity are not closed, so that the guide rod is divided into two symmetric portions, and a return spring is connected in the middle of the rectangular cavity.

Furthermore, in case that one gear shaft and one circular wheel are provided and the circular wheel is ellipse, a connection point between the gear shaft and the circular wheel is at a center of the ellipse, the circular wheel is tangent to the rectangular cavity, is located in the middle of the rectangular cavity, and is symmetric in relation to a connecting line between the striker bars; the two ends of the rectangular cavity are not closed, so that the guide rod is divided into two symmetric portions, and a return spring is connected to each end of the rectangular cavity respectively.

The present invention has the following advantages: (1) natural enemies are loaded into degradable spheres, and the distribution of natural enemies is achieved by distributing the spheres; therefore, the distributing can be easily manipulated; (2) the ranking device enables the degradable spheres to be distributed vertically in sequence, and ranks the degradable spheres automatically; (3) the adjustment portion can make adjustment according to the diameter of the degradable spheres, and achieves high applicability; (4) the distributing device is a high-speed reciprocating device, and distributes the degradable spheres at equal time interval; (5) the main body of the device is symmetric, and thereby the generated unbalance forces will cancel each other, and the device has no impact on the flight of the unmanned aerial vehicle.

In the FIGS.: 1*a*, 1*b*—blade; 2—rotating shaft; 3—sphere cabinet; 4*a*, 4*b*—support post; 5*a*—adjustment portion; 6*a*, 6*b* —gear shaft; 7*a*, 7*b*—slide groove; 8*a*, 8*b*—circular wheel; 9*a*, 9*b*—coupling; 10*a*, 10*b*—motor; 11*a*, 11*b*—motor support; 12—rolling bearing; 501—housing; 502—small bevel gear; 503—big bevel gear; 504*a*, 504*b*, 504*c*—adjustment sheet; 505—degradable sphere; 505*a*—storage hemisphere; 505*b*—packaging hemisphere; 505*c*—silicone ring; 13—guide rod; 14—base.

Embodiments

Hereunder, embodiments of the present invention will be further detailed with reference to the accompanying drawings.

Figure 1:
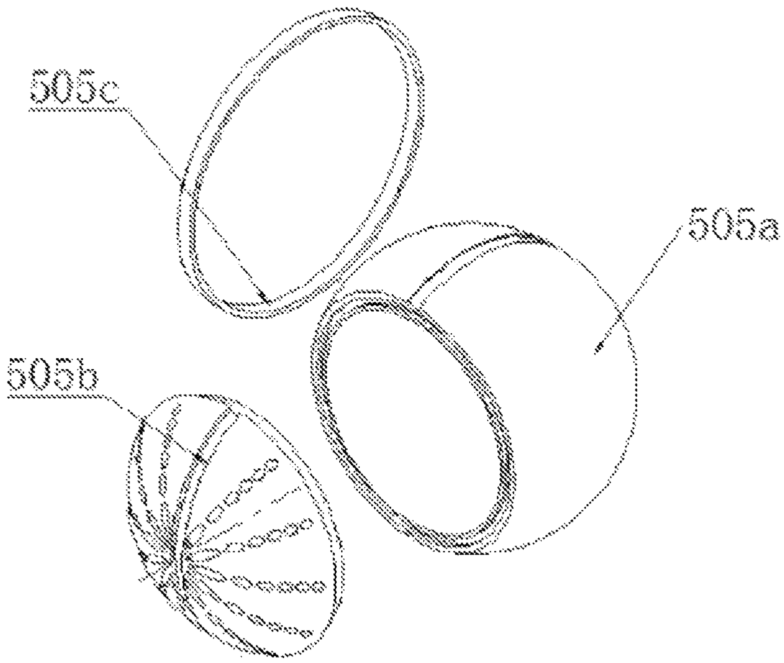
FIG. 1 is an exploded view of a degradable sphere according to the present invention.

FIG. 1 is an exploded view of a degradable sphere according to the present invention. As shown in FIG. 1, natural enemies and associated nutrient substances are placed in a storage hemisphere 505*a* which is fitted with a packaging hemisphere 505*b* via concave and convex grooves and is fixed with a silicone ring 505*c*; the packaging hemisphere 505*b* has air holes covered by a water-soluble film; the natural enemies can come out through the air holes after the degradable spheres are distributed to the ground by distributing device from an unmanned aerial vehicle and the film is dissolved; the spheres are degradable and will not pollute the environment.

Figure 2:
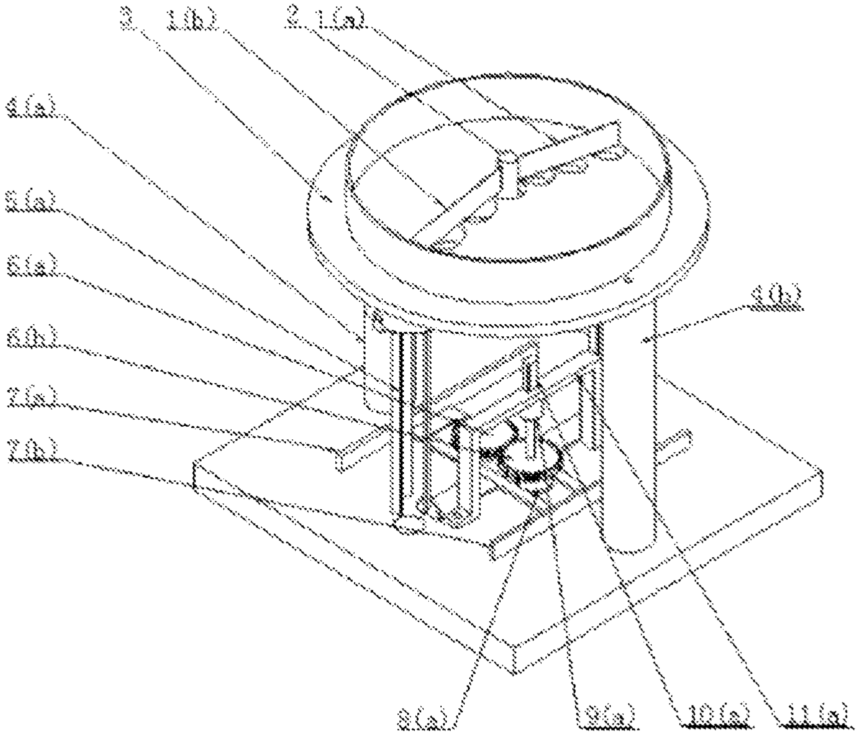
FIG. 2 is an overall structural view of the device according to the present invention.

FIG. 2 is an overall structural view of the device according to the present invention. As shown in FIG. 2, a large number of degradable spheres 505 are loaded into a ring-shaped area in a sphere cabinet 3, a motor 10*b* drives a rotating shaft 2 to rotate via a coupling 9*b*, the rotating shaft 2 drives blades 1*a* and 1*b* to rotate, so as to work with the conical surface to rank; the degradable spheres 505 enter into the housing 501 through an outmost sphere outlet on the bottom surface of the sphere cabinet 3, and then enter into adjustment sheets 504*a*, 504*b* and 504*c* that are connected to the housing 501; the first degradable sphere 505 passes through the adjustment sheets and falls into a spherical groove on the base 14, wherein, the spherical groove is concentric with the adjustment portions 5*a* and 5*b*; as the vertical distance between the top surface of the base 14 and the bottom end of the adjustment sheet of the adjustment portion 5*a* is greater than the diameter of a degradable sphere 505 and smaller than the sum of diameters of two degradable spheres 505, a second degradable sphere 505 is stacked on the first degradable sphere with the cooperation of the adjustment sheets 504*a*, 504*b* and 504*c*, the rest can be done in the same manner, and thus ranking is accomplished; a motor 11 a drives gear shafts 6*a*, 6*b* to rotate via a coupling 10*a*, and thereby drives circular wheels 8*a*, 8*b* to rotate and drive a guide rod 13 to reciprocate at a high speed; at a limit position, the guide rod 13 generates an instantaneous impact force to a degradable sphere 505 and pushes the degradable sphere 505 out of the spherical groove; thus, a first degradable sphere 505 is distributed; next, a second degradable sphere 505 falls into the spherical groove, and is pushed out by the guide rod 13, and the rest can be done in the same manner, and thus the degradable spheres are distributed at intervals.

Figure 3:
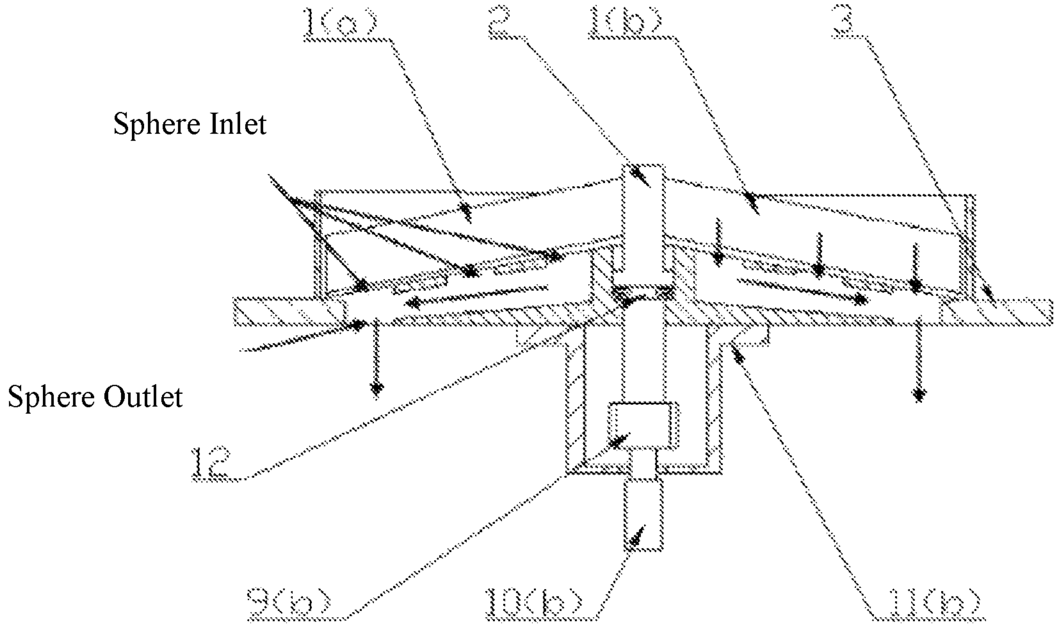
FIG. 3 is a sectional view of the ranking portion according to the present invention.

FIG. 3 is a section view of the ranking portion. The ranking portion comprises: two blades 1*a* and 1*b*, a rotating shaft 2, a sphere cabinet 3, a coupling 9*b*, a motor 10*b*, a motor support 11*b* and a rolling bearing 12, wherein, the blades 1*a* and 1*b* are 3 cm away from the end surface of the rotating shaft 2 and are connected via threads; the motor support 11*b* is located right below the sphere cabinet 3, the two ends of the motor support 11*b* are connected to the bottom of the sphere cabinet 3 via bolts, the motor 10*b* is fixed to the motor support 11*b* and connected to the coupling 9*b*, the coupling 9*b* is connected to the rotating shaft 2, the rolling bearing 12 is located below a shaft shoulder of the rotating shaft 2 and in clearance fit with the rotating shaft 2, and is positioned in the axial direction by means of the shaft shoulder. A large number of degradable spheres 505 are loaded into the sphere cabinet 3, and the degradable spheres 505 fall into sphere inlets under a combined action of the conical surface and the blades 1*a* and 1*b*; three sphere inlets communicate with each other to improve ranking speed; finally, the degradable spheres 505 enter into adjustment portions 5*a* and 5*b* through sphere outlets.

Figure 4:
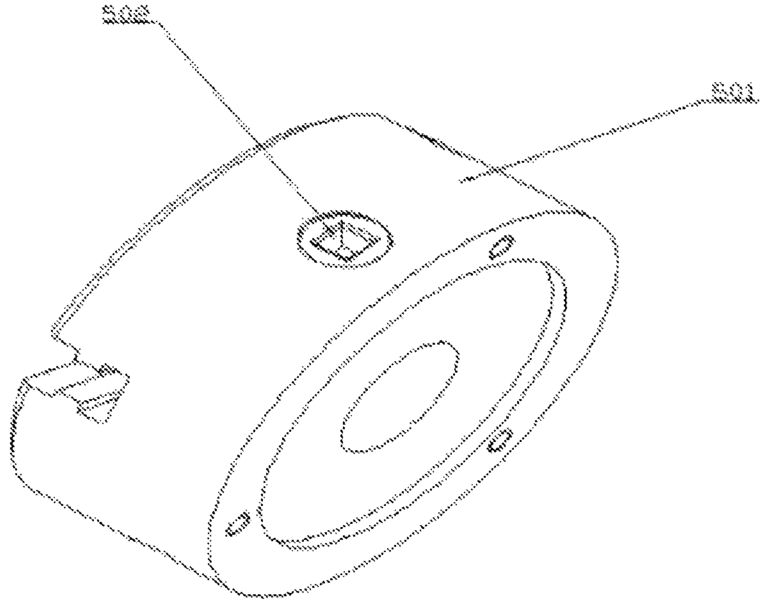
FIG. 4 is an assembly view of the housing of the adjustment portion according to the present invention.

FIG. 4 is an assembly view of the housing of the adjustment portion. As shown in FIG. 4, a shaft end of the small bevel gear 502 is located on the wall of the housing, and engaged with a side face of the big bevel gear mounted in the housing.

Figure 5:
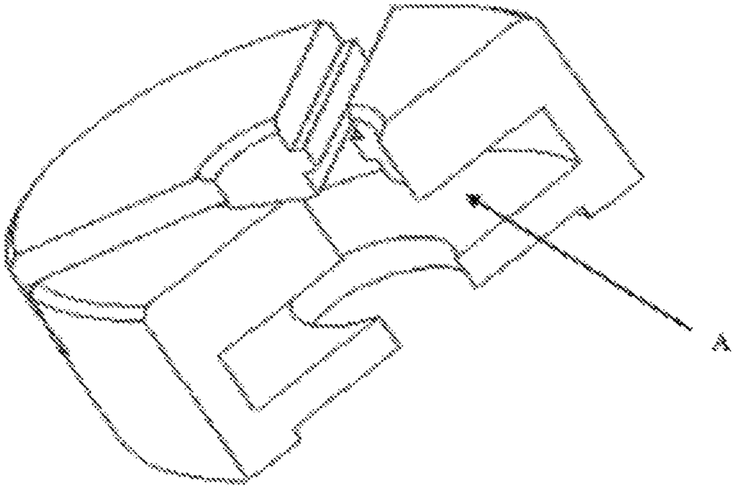
FIG. 5 is a section view of the interior of the housing portion according to the present invention.

FIG. 5 is a sectional view of the interior of the housing portion according to the present invention. As shown in FIG. 5, the small bevel gear 502 is engaged with a side face of the big bevel gear 503, and is mounted inside the housing A; the bottom surfaces of three adjustment sheets 504*a*, 504*b* and 504*c* are located in three I-shaped grooves uniformly distributed in the housing 501.

Figure 6:
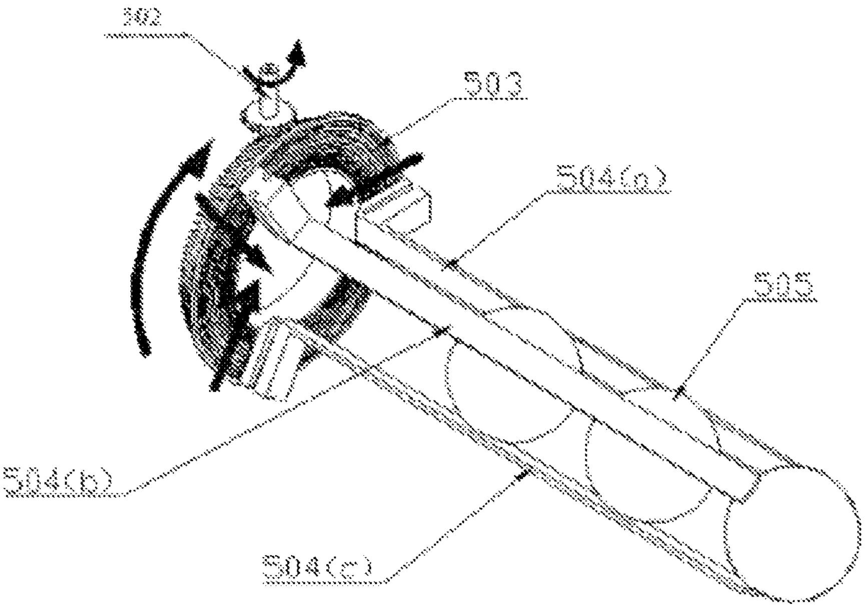
FIG. 6 shows the power unit of the adjustment portion according to the present invention.

FIG. 6 shows the power unit of the adjustment portion according to the present invention, which comprises: a small bevel gear 502, a big bevel gear 503, and three adjustment sheets 504*a*, 504*b* and 504*c*; the small bevel gear 502 mounted on the wall of the housing 501 is engaged with a side face of the big bevel gear 503 mounted inside the housing 501, the three adjustment sheets 504*a*, 504*b* and 504*c* are evenly distributed on the circumference of the bottom surface of the big bevel gear 503. The big bevel gear 503 can be driven by rotating the small bevel gear 502, so that the three adjustment sheets 504*a*, 504*b* and 504*c* retract or extend in the radial direction, to adapt to the diameter of the spheres to be distributed; since the distances between the three adjustment sheets 504*a*, 504*b* and 504*c* and the center of the housing 501 are the same, and the adjustment sheets are distributed annularly on the back of the big bevel gear 503 with an angle of 120° between each other, the connecting lines between the edges of the three adjustment sheets 504*a*, 504*b* and 504*c* at the same height form an equilateral triangle, the inscribed circle diameter of which is the maximum diameter of degradable spheres 505 that can pass through the equilateral triangle. By moving the three adjustment sheets 504*a*, 504*b* and 504*c* in the radial direction at the same time, the size of the equilateral triangle can be controlled, and thereby the size of the degradable spheres 505 passing through the adjustment sheets can be controlled.

Figure 7:
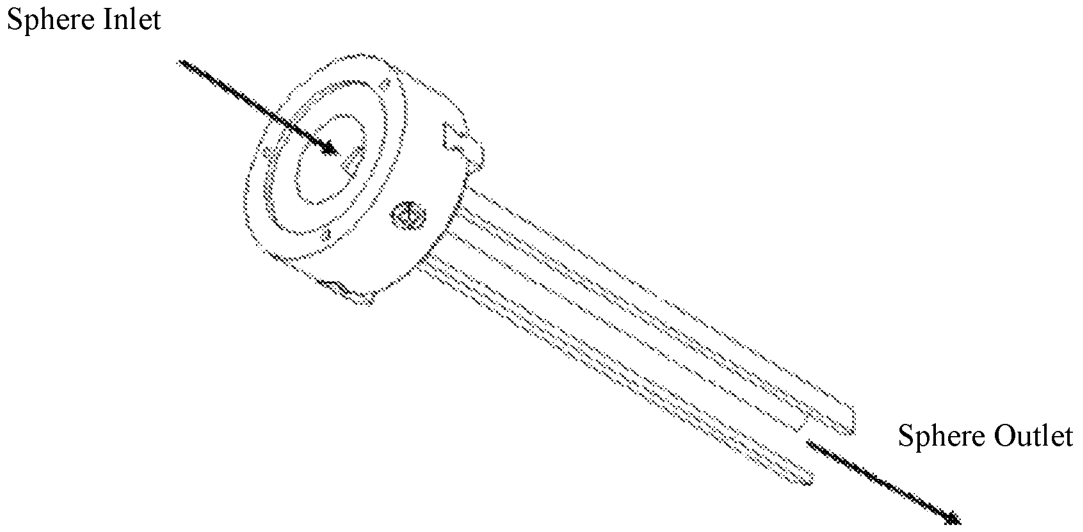
FIG. 7 is an overall view of the adjustment portion according to the present invention.

FIG. 7 is an overall view of the adjustment portion according to the present invention. As shown in FIG. 7, the sphere enters into the housing 501 through an upper port, passes through the interior of the housing, and then enters into the adjustment sheets 504*a*, 504*b* and 504*c*.

Figure 8:
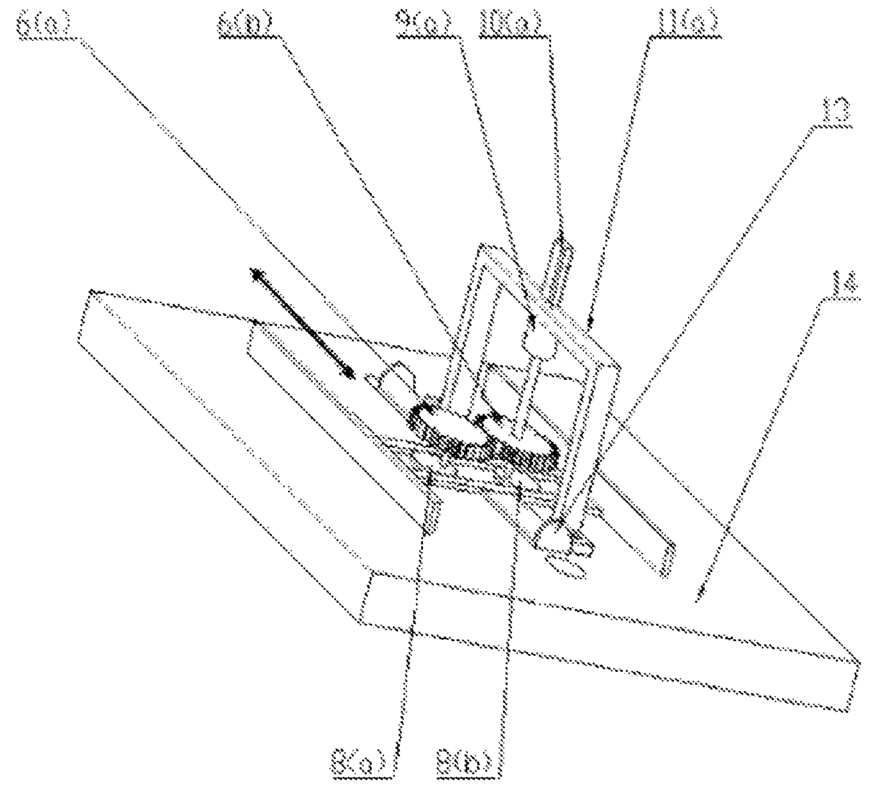
FIG. 8 is a 3D view of the distributing portion according to the present invention.

FIG. 8 is a 3D view of the distributing portion according to the present invention. As shown in FIG. 8, the distributing portion comprises: two circular wheels 8*a* and 8*b*, two gear shafts 6*a* and 6*b*, a coupling 9*a*, a motor 10*a*, a motor support 11*a*, a guide rod 13, and a base 14; wherein, the two circular wheels 8*a* and 8*b* are tangent to an closed rectangular cavity of the guide rod 13 and connected to the two gear shafts 6*a* and 6*b* at a point offset from the center by ⅔ radius; the motor support 11*a* is connected to the base 14 via bolts; the guide rod 13 is located in a slide groove of the base 14; a spherical groove is arranged on the base 14 at a position facing the centers of the adjustment portions 5*a* and 5*b*, so that the degradable spheres 505 will not roll around after falling; the two gear shafts 6*a* and 6*b* drive the two circular wheels 8*a* and 8*b* to move respectively, and thereby drive the guide rod 13 to reciprocate at a high speed; when the guide rod 13 moves to a limit position, it creates instantaneous impact force to push a degradable sphere 505 out of the shallow groove, and thereby the degradable sphere is distributed; the guide rod 13 may have two limit positions within one movement cycle, thus, two degradable spheres 505 can be distributed at an equal time interval.

Figure 9:
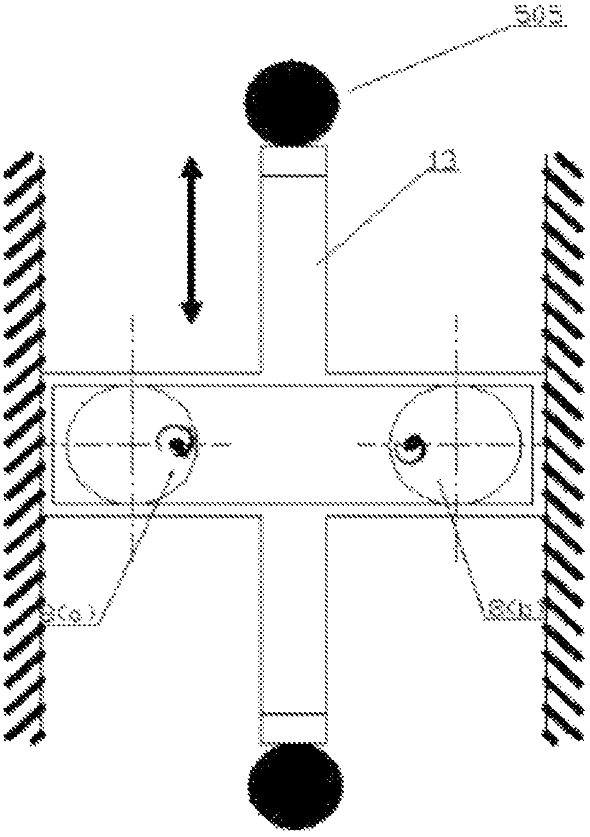
FIG. 9 is a schematic view of a first movement of the distributing portion.

FIG. 9 is a schematic view of a first movement of the distributing portion. As shown in FIG. 9, the two circular wheels 8*a* and 8*b* are tangent to the inner side of the guide rod 13 and symmetric in relation to the center line of the guide rod 13, the rotating shafts are offset from the center by ⅔ radius, the two circular wheels 8*a* and 8*b* are rotated by gear transmission at the same time, and thereby the guide rod 13 is driven to reciprocate; thus, the degradable spheres can be released quickly one by one at intervals; the eccentric distance is the stroke of the guide rod; the rotation directions and movement directions of the components are shown in FIG. 9.

Figure 10:
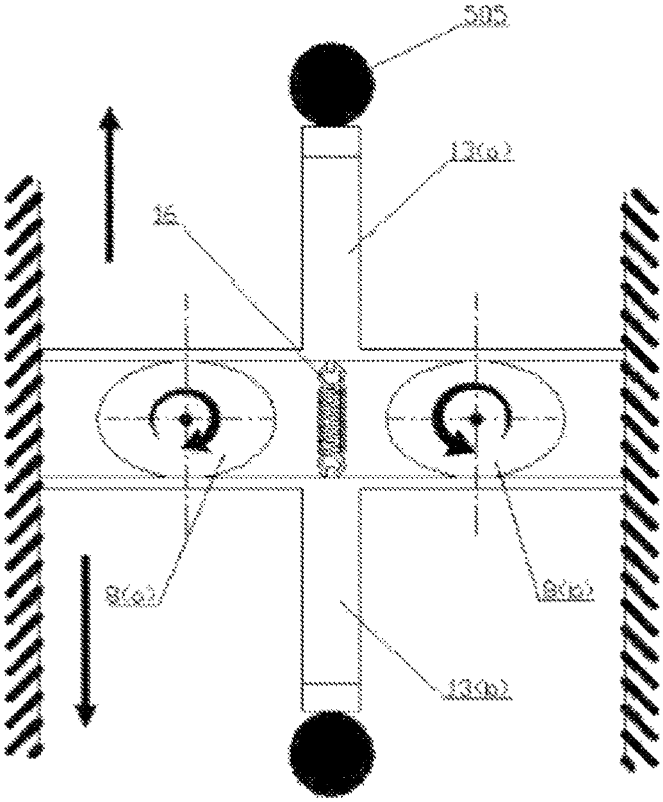
FIG. 10 is a schematic view of a second movement of the distributing portion.

FIG. 10 is a schematic view of a second movement of the distributing portion. As shown in FIG. 10, two elliptical wheels 8*a* and 8*b* are at the same positions as the circular wheels shown in FIG. 9, guide rods 13*a* and 13*b* are connected via a return spring 16, the two elliptical wheels rotate around the centers of the ellipse at the same time; thus, the degradable spheres can be distributed quickly two by two at intervals.

The rotation directions and movement directions of the components are shown in FIG. 10.

Figure 11:
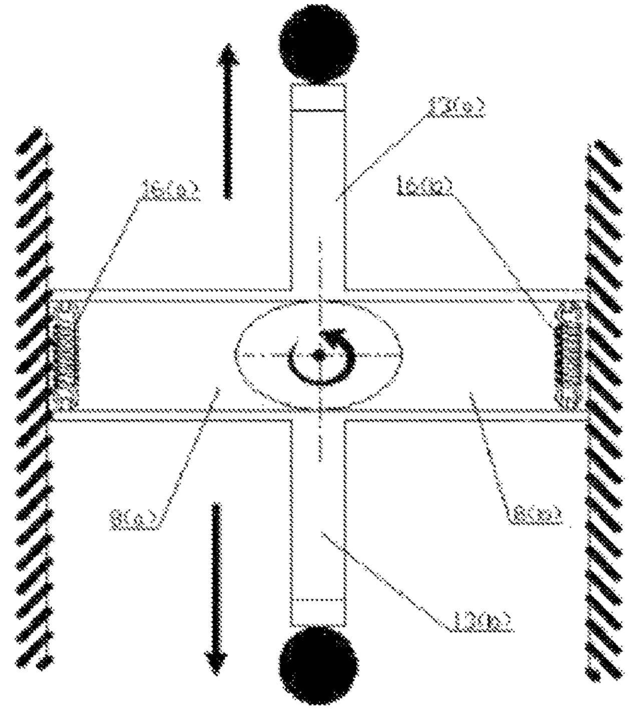
FIG. 11 is a schematic view of a third movement of the distributing portion.

FIG. 11 is a schematic view of a third movement of the distributing portion. As shown in FIG. 11, the working principle of the mechanism is similar to that shown in FIG. 10; finally, the degradable spheres are distributed two by two at intervals. Since there are two return springs and one elliptical wheel, the guide rod suffers higher spring resistance, and the device is suitable for low-speed distributing.

The invention claimed is:

1. An automatic degradable sphere distributing device for unmanned aerial vehicle, wherein, it comprises: a ranking portion, an adjustment portion, a distributing portion, and a base; the ranking portion comprises: two blades, a rotating shaft, a sphere cabinet, and a driving portion that drives the rotating shaft to rotate, wherein, the ranking portion is fixed to the base via two support posts on the bottom surface of the sphere cabinet, a ring-shaped area is arranged on the surface of the sphere cabinet, and the bottom surface of the ring-shaped area is a conical surface, which is higher at the center and lower on the periphery; a shaft hole is arranged at the center of the conical surface, the rotating shaft is mounted in the shaft hole and connected to the driving portion fixed to the bottom surface of the sphere cabinet, and sphere inlets are distributed symmetrically on the conical surface, centering on the rotating shaft; the two blades are mounted on the rotating shaft symmetrically and match the shape of the conical surface; inclined sphere transport channels are arranged between the bottom surface of the conical surface and the bottom surface of the sphere cabinet, and are connected to sphere outlets on the bottom surface of the sphere cabinet;

the adjustment portion consists of two portions, each of which comprises a housing, a small bevel gear, a big bevel gear, and three adjustment sheets; the housing is mounted on the bottom surface of the sphere cabinet symmetrically, and is located below the sphere outlet in the bottom surface of the sphere cabinet, a shaft end of the small bevel gear is located on the wall of the housing and is engaged with a side of the big bevel gear mounted in the housing, the three adjustment sheets are evenly distributed on the circumference of the bottom surface of the big bevel gear, the big bevel gear can be driven by rotating the small bevel gear, so that the three adjustment sheets retract or extend in the radial direction to adapt to the diameter of spheres to be distributed;

spherical grooves are arranged on the surface of the base right below the adjustment portion, so that degradable spheres distributing from the adjustment portion will not roll around;

the distributing portion is below the adjustment portion and between two spherical grooves on the surface of the base, and comprises: a circular wheel, a driving mechanism that drives the circular wheel to rotate, a guide rod, and slide grooves; two slide grooves are fixed to the base and parallel to each other; the guide rod is located between the two slide grooves, a rectangular cavity portion of the guide rod is perpendicular to the slide grooves, the circular wheel is located in the rectangular cavity and tangent to two sides of the rectangular cavity, striker bars of the guide rod are fixed to two sides of the rectangular cavity, in line with the two spherical grooves and parallel to the slide grooves; when the driving mechanism drives the circular wheel to rotate, the rectangular cavity will work with the slide grooves to drive the striker bars of the guide rod to slide back and forth to strike the spheres, so that the spheres are distributed.

2. The automatic degradable sphere distributing device for unmanned aerial vehicle according to claim 1, wherein: the cross section of the sphere transport channel is circular; the cone angle of the bottom surface of the ring-shaped area is 20°; six sphere inlets are distributed symmetrically on the conical surface at an equal interval; the two blades are in the same plane; the lower edge of the blade is parallel to the conical surface, with 2-3 mm clearance from the conical surface and the inner side of the ring-shaped area.

3. The automatic degradable sphere distributing device for unmanned aerial vehicle according to claim 1, wherein: the driving portion that drives the rotating shaft to rotate comprises a coupling, a motor, a motor support, and a rolling bearing; the motor support is located right below the sphere cabinet, the two ends of the motor support are connected to the bottom of the sphere cabinet via bolts, the motor is fixed to the motor support and connected to the coupling, the coupling is connected to the rotating shaft, the rolling bearing is located below a shaft shoulder of the rotating shaft in clearance fit with the rotating shaft, and is positioned in the axial direction by means of the shaft shoulder.

4. The automatic degradable sphere distributing device for unmanned aerial vehicle according to claim 1, wherein: the bottom surface of the big bevel gear has rectangular threads, the adjustment sheet is in an inverted L-shape and is mounted to the bottom surface of the big bevel gear via the bottom edge of the L-shape, the bottom edge of the L-shape also has rectangular threads engaged with the rectangular threads on the bottom surface of the big bevel gear, and the bottom edge of the L-shape is fitted in an I-shaped slide channel on the housing, so that the big bevel gear drives the three adjustment sheets to retract or extend linearly in the radial direction; the three L-shaped adjustment sheets are at the same distance to the center of the housing, the inner side of each adjustment sheet is embossed, and the adjustment sheets are distributed annularly on the back of the big bevel gear, with an angle of 120° between each other; the mass of the degradable sphere is m, the diameter of the sphere is d, and the maximum bearing pressure is F, then the length of each adjustment sheet is $$l \leq \frac{F}{mg} \times d;$$

a 45° chamfer exists at the intersection between the bottom edge and the vertical edge of each of the three L-shaped adjustment sheets, to ensure a sphere can pass through the housing and enter into the adjustment sheets successfully.

5. The automatic degradable sphere distributing device for unmanned aerial vehicle according to claim 1, wherein: a layer of cotton is lined on the bottom of the spherical groove and a piece of smooth and soft paper is laid on the cotton, to attain a buffer function for a falling degradable sphere and reduce the friction force suffered by the sphere when exiting the groove; the vertical distance between the top surface of the base and the bottom of the adjustment sheet is greater than the diameter of a degradable sphere and smaller than the sum of diameters of two degradable spheres.

6. The automatic degradable sphere distributing device for unmanned aerial vehicle according to claim 1, wherein: the cross section of each end of the striker bar of the guide rod is semi-circular, so that the striker bar can push a degradable sphere out of the spherical groove easily to facilitate distributing.

7. The automatic degradable sphere distributing device for unmanned aerial vehicle according to claim 1, wherein: the driving mechanism that drives the circular wheel to rotate comprises a gear shaft, a coupling, a motor, and a motor support, wherein, the motor support is connected to the base via bolts, the motor is fixed to the motor support and connected to the coupling, the coupling is connected to the gear shaft, and the gear shaft is connected to the circular wheel via a flat key.

8. The automatic degradable sphere distributing device for unmanned aerial vehicle according to claim 1, wherein: in case that two gear shafts and two circular wheels are provided and the circular wheels are standard circles, a connection point between the gear shaft and the circular wheel is offset from the center of the circular wheel by ⅔ radius and is in a horizontal symmetric center line of the rectangular cavity, and the circular wheel is tangent to the rectangular cavity and is symmetric in relation to a connecting line between the striker bars; the two ends of the rectangular cavity are closed and fitted in the slide grooves, so that the guide rod is an integral piece;

in a case that two gear shafts and two circular wheels are provided and the circular wheels are ellipse, a connection point between the gear shaft and the circular wheel is at a center of the ellipse, the ellipse is tangent to the rectangular cavity and is symmetric in relation to a connecting line between the striker bars; the two ends of the rectangular cavity are not closed, so that the guide rod is divided into two symmetric portions, and a return spring is connected in the middle of the rectangular cavity;

in case that one gear shaft and one circular wheel are provided and the circular wheel is ellipse, a connection point between the gear shaft and the circular wheel is at a center of the ellipse, the circular wheel is tangent to the rectangular cavity, is located in the middle of the rectangular cavity, and is symmetric in relation to a connecting line between the striker bars; the two ends of the rectangular cavity are not closed, so that the guide rod is divided into two symmetric portions, and a return spring is connected to each end of the rectangular cavity respectively.

9. The automatic degradable sphere distributing device for unmanned aerial vehicle according to claim 1, wherein: the degradable sphere comprises: a storage hemisphere, a packaging hemisphere, and a silicone ring; wherein, the storage hemisphere and the packaging hemisphere are fitted with each other via concave and convex grooves to form a sphere, and are fixed with the silicone ring; the storage hemisphere accounts for ⅔ of the total volume of the sphere, so that more natural enemies and nutrient substances can be stored in the storage hemisphere; the packaging hemisphere has evenly distributed air holes and the external surface of the packaging hemisphere is coated with a water-soluble film, to facilitate going out of the natural enemies.

10. The automatic degradable sphere distributing device for unmanned aerial vehicle according to claim 9, wherein: the diameter of the air holes is greater than the maximum dimension of the natural enemy by 3 mm; the air holes on the packaging hemisphere are spaced apart from each other by 5 mm in the direction of the sphere generatrices which are arranged along the circumference with an angle of 40° between each other; the spheres are made of degradable materials by milling 30 wt % rice husks, 50 wt % straws and 15 wt % wood flour, mixing with 3 wt % hot-melt adhesive and 2 wt % glue, and then hot-press molding the mixture; therefore, the spheres will not pollute the environment.

* * * * *